(12) United States Patent
Navarro

(10) Patent No.: US 10,305,171 B1
(45) Date of Patent: May 28, 2019

(54) ELECTRONIC DEVICES WITH ANTENNA ARRAYS

(71) Applicant: Blue Digs LLC, Wilmington, DE (US)

(72) Inventor: Julio Navarro, Kent, WA (US)

(*) Notice: Subject to any disclaimer, the term of this patent is extended or adjusted under 35 U.S.C. 154(b) by 0 days.

(21) Appl. No.: 15/672,167

(22) Filed: Aug. 8, 2017

Related U.S. Application Data

(60) Provisional application No. 62/489,372, filed on Apr. 24, 2017.

(51) Int. Cl.
| | |
|---|---|
| *H01Q 1/24* | (2006.01) |
| *H01Q 1/36* | (2006.01) |
| *H01Q 5/307* | (2015.01) |
| *H04M 1/725* | (2006.01) |
| *H04B 1/3888* | (2015.01) |

(52) U.S. Cl.
CPC ............ *H01Q 1/243* (2013.01); *H01Q 1/36* (2013.01); *H01Q 5/307* (2015.01); *H04B 1/3888* (2013.01); *H04M 1/72522* (2013.01)

(58) Field of Classification Search
CPC .......... H01Q 1/243; H01Q 5/307; H01Q 1/36; H04B 1/3888; H04M 1/72522
See application file for complete search history.

(56) References Cited

U.S. PATENT DOCUMENTS

| | | | | |
|---|---|---|---|---|
| 2008/0246679 | A1* | 10/2008 | Martek ................ | H01Q 1/362 343/793 |
| 2010/0097285 | A1* | 4/2010 | Hayashi ................ | H01Q 9/26 343/803 |
| 2014/0106684 | A1* | 4/2014 | Burns .................... | H01Q 1/243 455/78 |
| 2014/0232606 | A1* | 8/2014 | Niver .................... | H01Q 9/285 343/797 |
| 2016/0308563 | A1* | 10/2016 | Ouyang ............... | H04B 1/1081 |

* cited by examiner

*Primary Examiner* — Howard Williams

(57) ABSTRACT

Electronic devices may be provided with antenna arrays and wireless circuitry for handling wireless communications in satellite communications bands and other frequency bands of interest. A portable electronic device may have a housing with a peripheral edge. An array of antennas in the portable device may extend along the peripheral edge and may be coupled (directly or indirectly) to wireless circuitry that transmits and receives satellite communications signals and/ or other wireless communications signals. The antennas may include dipole antennas. The dipole antennas may include edge dipole antennas with straight arms that extend parallel to one or more peripheral housing edges. Additionally or alternatively, the dipole antennas may include corner dipole antennas at the corners of the housing. The corner dipole antennas may have arms with bent tips. A ground plane in the center of the electronic device may serve as a reflector for the peripheral dipole antennas.

21 Claims, 6 Drawing Sheets

ELECTRONIC DEVICES WITH ANTENNA ARRAYS

This application claims the benefit of provisional patent application No. 62/489,372, filed on Apr. 24, 2017, which is hereby incorporated by reference herein in its entirety.

FIELD

This relates generally to communications, including to wireless communications involving a satellite link.

BACKGROUND

Communications systems often use satellites to convey data. Satellite-based systems allow information to be conveyed wirelessly over large distances, such as oceans. For example, satellite-based systems can be used to convey information to land-based devices such as handheld equipment and home or office equipment. Further, satellite communications systems can be used to provide coverage where physical infrastructure has not been installed and/or to mobile devices that do not remain attached to an infrastructure resource.

It can be challenging to implement an effective satellite-based communications system. If care is not taken, satellites may be deployed inefficiently, leading to elevated costs and suboptimal ground coverage. Further, if a satellite-based communications system is designed to serve a period or region of highest demand, resources may remain idle during periods of lower demand and/or over regions with lower demand. Moreover, a conventional satellite-based communication system designed for a particular demand level may not be able to dynamically increase capacity in response to higher demand.

SUMMARY

Electronic devices may be provided with antenna arrays and wireless circuitry for handling wireless communications at satellite communications bands and other frequency bands of interest. The electronic devices may implemented as portable electronic devices, such as handheld devices, mobile computing devices, etc., but also may include any other electronic equipment with a satellite communications capability.

A portable electronic device, such as a handheld device, may have a housing with a peripheral edge. An array of antennas in the portable device may include antennas that extend along the peripheral edge of the housing. The antennas may be coupled to wireless circuitry that transmits and receives satellite communications signals and other wireless communications signals.

The antennas may include dipole antennas, patch antennas, and other antennas. Dipole antennas may include edge dipole antennas with straight arms that extend parallel to one or more peripheral housing edges and may include corner dipole antennas, e.g., situated at the corners of the housing. In some embodiments, the corner dipole antennas may have arms with bent tips. A ground plane, e.g., in the center of the electronic device may serve as a reflector for the peripheral dipole antennas.

DETAILED DESCRIPTION

The present disclosure, including the accompanying drawings, is illustrated by way of examples and not by way of limitation.

A communications network may include one or more communications satellites and other equipment, including ground-based communications equipment and user terminals (or user equipment (UE)). For example, user terminals can be implemented in a form factor similar to that of a smart phone or other such personal communication device. One or more of the satellites may be used to deliver wireless services, e.g., to portable electronic devices, home and/or office equipment, and other equipment. For example, wireless services can be provided to handheld devices, wearable devices, set-top boxes, media devices, mobile terminals, computing devices, sensors, etc.

Figure 1:
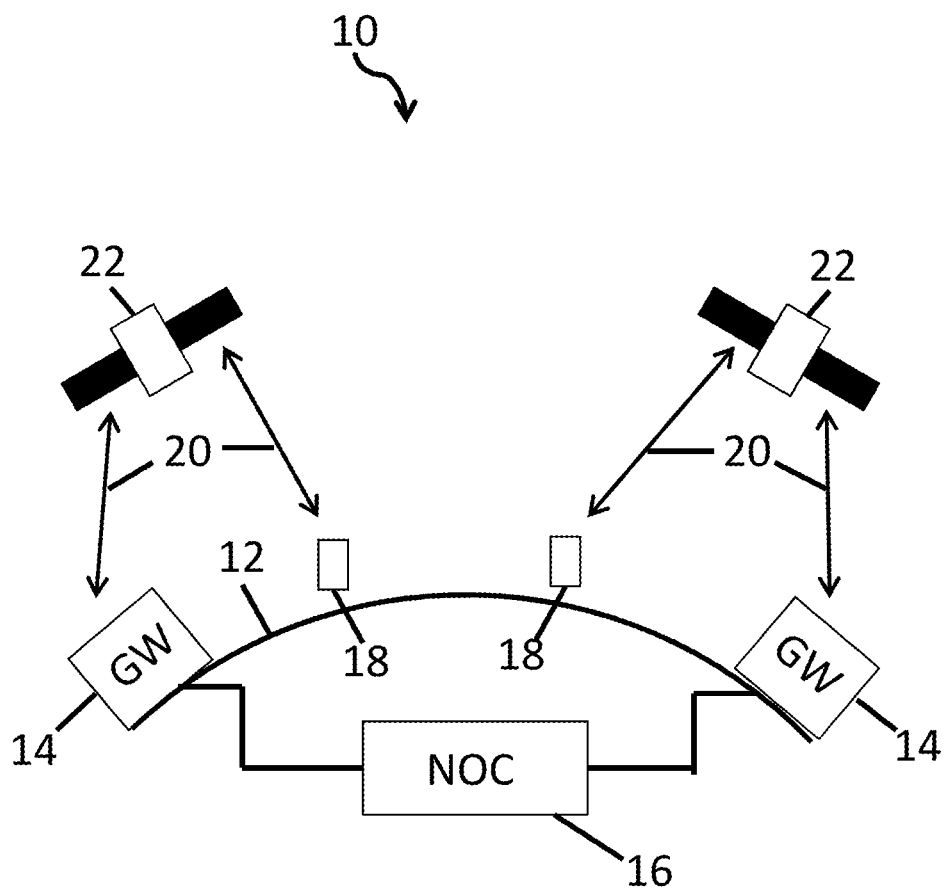
FIG. 1 presents a diagram of an example communications system including satellites, in accordance with some embodiments.

An illustrative communications system with satellites is shown in FIG. 1. As shown in FIG. 1, system 10 may include one or more constellations of communications satellites 22. Satellites 22 may be placed in any/all of low earth orbit (LEO) (e.g., at altitudes of 500-1500 km or other suitable altitudes), geosynchronous orbit, and/or medium earth orbit (MEO) around the Earth 12. Satellites 22 may form a satellite constellation having one or more sets of satellites with different types of orbits, e.g., that are synchronized with each other to provide user populations (or geographic regions) with desired amounts of coverage. There may be any suitable number of satellites 22 in the satellite constellation(s) of system 10 (e.g., 10-100, 1,000-10,000, more than 100, more than 1000, fewer than 10,000, etc.).

Satellites 22 may deliver wireless services to equipment such as electronic devices 18. Electronic devices 18 may include handheld devices and/or other mobile devices, such as cellular telephones, tablet computers, laptop computers, wristwatches and other wearable devices, mobile terminals, drones, robots, and other portable electronic devices. Electronic devices 18 may also include stationary (or less portable) equipment, such as set-top boxes (e.g., satellite receivers), routers, home base stations, televisions, desktop computers, ground terminals (e.g., gateways), and other electronic equipment. Electronic devices 18 may be located anywhere on or above the Earth, e.g., on land, at sea, or in the air. The services provided by satellites 22 may include telephone (voice) service, broadband internet access, media distribution services such as satellite audio (satellite radio and/or streaming audio services) and satellite television (video), data communications, location, and/or other services.

System 10 may include one or more network operations centers (NOCs) such as NOC 16, which can be coupled to one or more gateways, e.g., gateways 14. There may be any suitable number of gateways 14 in system 10 (e.g., 1-100, more than 10, more than 100, fewer than 1000, etc.). Gateways 14 may have transceivers that allow the gateways to transmit wireless signals to satellites 22 over wireless links 20 and that allow the gateways to receive wireless signals from satellites 22 over wireless links 20. Wireless links 20 may also be used to support communications between satellites 22 and electronic devices 18. During media distribution operations, for example, a gateway 14 may send traffic over an uplink (one of links 20) to a given satellite 22 that is then routed via a downlink (one of links 20) to one or more electronic devices 18. Gateways 14 may perform a variety of services, including supplying media for electronic devices 18, routing telephone calls (e.g., voice and/or video calls) between electronic devices 18 and/or other equipment, providing electronic devices 18 with internet access, and/or delivering other communications and/or data services to electronic devices 18. Gateways 14 may communicate with each other via satellites 22 and/or using ground-based communications networks.

NOC 16 may be used to manage the operations of one or more gateways 14 and/or the operations of one or more satellites 22. For example, NOC 16 may monitor network performance and take appropriate corrective actions if warranted. During these operations, NOC 16 may update software for one or more satellites 22 and/or electronic devices 18, may adjust satellite 22 altitude and/or other orbital parameters, may direct one or more satellites 22 to perform operations to adjust satellite solar panels and/or other satellite components, and/or may otherwise control and maintain one or more of the satellites 22 in the constellation of satellites orbiting the Earth 12. Further, in some embodiments, NOC 16 also may be configured to perform maintenance operations on one or more gateways 14.

Gateways 14, satellites 22, NOC 16, and electronic devices 18 may be configured to support encrypted communications. For example, NOC 16 and gateways 14 may communicate using encrypted communications. Similarly, gateways 14, satellites 22, and electronic devices 18 may communicate using encrypted communications. This allows NOC 16 to issue secure commands and to receive secure information when communicating with gateways 14, satellites 22, and/or electronic devices 18. The use of encrypted communications within system 10 also allows electronic devices 18 to securely communicate with each other and with gateways 14, and also allows gateways 14 to securely distribute media and/or other information to electronic devices 18, e.g., in compliance with digital protection requirements.

During operation of system 10, satellites 22 may serve as orbiting relay stations. For example, when a gateway 14 transmits a wireless uplink signal, one or more satellites 22 may forward these signals as downlink signals to one or more electronic devices 18. In some embodiments, some electronic devices 18 may be receive-only devices while other electronic devices 18 may support bidirectional communications with satellites. In scenarios in which an electronic device 18 supports bidirectional communications, an electronic device 18 may transmit wireless signals to one or more satellites 22, so that the one or more satellites 22 may relay this information to one or more appropriate destinations (e.g., gateways 14, other electronic devices 18, etc.).

Satellites 22 and links 20 may support any suitable satellite communications bands (e.g., IEEE bands), such as the L-band (1-2 GHz), S-band (2-4 GHz), C-band (4-8 GHz), Ka-band (27-40 GHz), V-band (40-75 GHz), W-band (75-110 GHz), and/or other bands suitable for space communications (e.g., frequencies above 1 GHz, below 110 GHz, and/or other suitable frequencies).

Some frequencies (e.g., C-band frequencies and other low frequencies such as L-band and S-band frequencies) may penetrate buildings and may therefore be suitable for communicating with electronic devices located indoors at least some of the time, e.g., handheld electronic devices 18 (e.g., devices that are mobile and that may sometimes be indoors and may sometimes be outdoors) and/or electronic devices 18 without an external antenna/receiver. Other frequencies (e.g., V-band frequencies and other high frequencies such as Ka-band and W-band frequencies) do not readily (or effectively) penetrate buildings and may therefore be suitable for communicating with electronic devices 18 that have an external antenna/receiver or that are located outdoors and/or otherwise have a line-of-sight path to satellites 22. To accommodate a variety of scenarios, e.g., both mobile device scenarios and home/office scenarios, satellites 22 may, for example, include C-band satellites (or other low band satellites such as L-band or S-band satellites), V-band satellites (or other high band satellites such as Ka-band or W-band satellites) and/or dual-band satellites (e.g., satellites that that support C-band and V-band communications or other low and high band communications).

Figure 2:
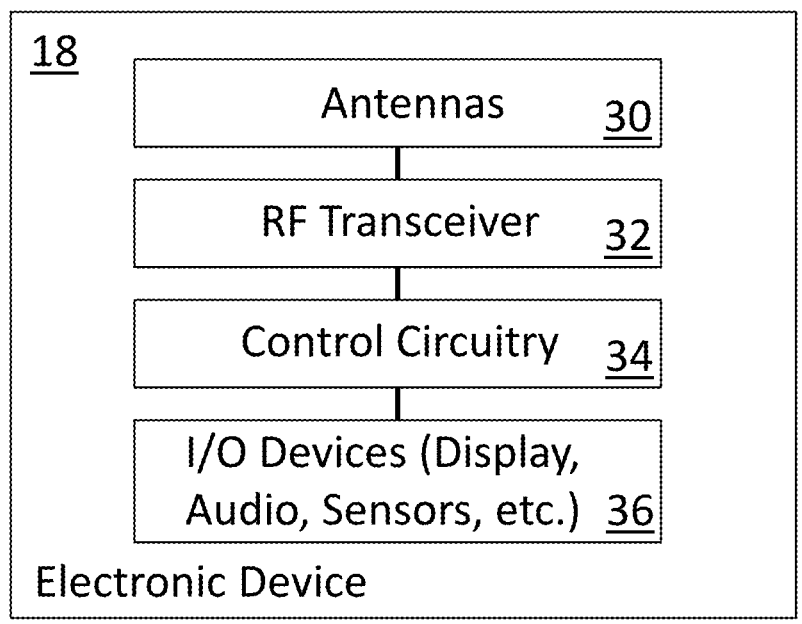
FIG. 2 presents a schematic diagram of an electronic device with wireless circuitry for communicating with satellites, in accordance with some embodiments.

A schematic diagram of an illustrative electronic device 18 is shown in FIG. 2. Device 18 may be a handheld electronic device (e.g., a cellular telephone, tablet computer, or other portable electronic equipment), a portable device, a wearable device, or other electronic device that uses wireless communications to communicate with one or more satellites 22. The wireless communications may involve any/all of C-band satellite communications with C-band satellites (or other low band communications, such as L-band or S-band satellite communications frequencies), may involve communications with V-band satellites (or other high band satellites such as Ka-band or W-band satellites), or other satellite communications. In some illustrative embodiments, which may sometimes be described herein as an example or examples, device 18 may be a portable handheld electronic device that uses an array of antennas to communicate wirelessly with a satellite, such as a low band satellite (e.g., using C-band communications or L-band or S-band communications). Other configurations of the electronic device 18 also are possible, e.g., in other handheld, portable, or wearable form factors.

As shown in FIG. 2, electronic device 18 may include one or more antennas 30. Antennas 30 may include any/all of monopoles, dipoles, and/or other types of antenna elements. Antennas 30 may, for example, include loop antennas, helical antennas, patch antennas, inverted-F antennas, Yagi antennas, slot antennas, horn antennas, cavity antennas, dish antennas, arrays of antennas (e.g., a phased antenna array that supports beam steering operations), or other suitable antennas. Antennas 30 may be coupled (directly or indirectly) to wireless circuitry 32 (e.g., radio-frequency transceiver circuitry, baseband processing circuitry, amplifiers, filters, switches, etc.). Wireless circuitry 32 can include any analog and/or digital circuitry and circuit elements to perform communications with a satellite resource. Wireless circuitry 32 may include radio-frequency transmitter circuitry and/or radio-frequency receiver circuitry (components) that allows electronic device 18 to transmit and/or receive wireless signals over a communications link, e.g., a C-band wireless link (and, if desired, any/all of cellular telephone wireless links (e.g., LTE), IEEE 802.11 links, Bluetooth links, and/or other wireless local area network links, etc.) using one or more antennas 30. In some implementations, one or more components and/or antennas can be shared by two or more radio access technologies. Further, one or more components and/or antennas can be dedicated to use for a particular radio access technology, e.g., a satellite technology.

Electronic device 18 may also include control circuitry 34 and input-output devices 36. Control circuitry 34 may include storage such as any/all of solid-state drives, random-access memory, hard disk drives, and/or other volatile and/or nonvolatile memory. Control circuitry 34 may also include microcontrollers, microprocessors, digital signal processors, communications circuits with processors, application specific integrated circuits, programmable logic devices, field programmable gate arrays, and/or other processing circuitry. During operation, control circuitry 34 may run (execute) code (computer instructions) that is stored in the storage of control circuitry 34 to implement desired functions for electronic device 18.

Control circuitry 34 may use input-output devices 36 to supply output perceivable by a user and/or to external equipment, and may use input-output devices 36 to gather input from a user and/or external sources. Input-output devices 36 may include one or more displays, audio devices, sensors, microphones, touch sensitive devices/regions, control surfaces, buttons, and/or other components. For example, input-output devices 36 may include user input devices, such as buttons, touch screens, accelerometers, microphones (for gathering voice commands), and/or other components for gathering input from a user. Input-output devices 36 may also include speakers, light-emitting components, displays, vibrators and other haptic output devices, and other output equipment for presenting output that is perceivable by a user. Input-output devices 36 may include sensors, such as force sensors, position sensors, gyroscopes, magnetic sensors, accelerometers, capacitive touch sensors, proximity sensors, ambient light sensors, temperature sensors, moisture sensors, gas sensors, pressure sensors, and other sensors for gathering information on the environment surrounding device 18.

Figure 3:
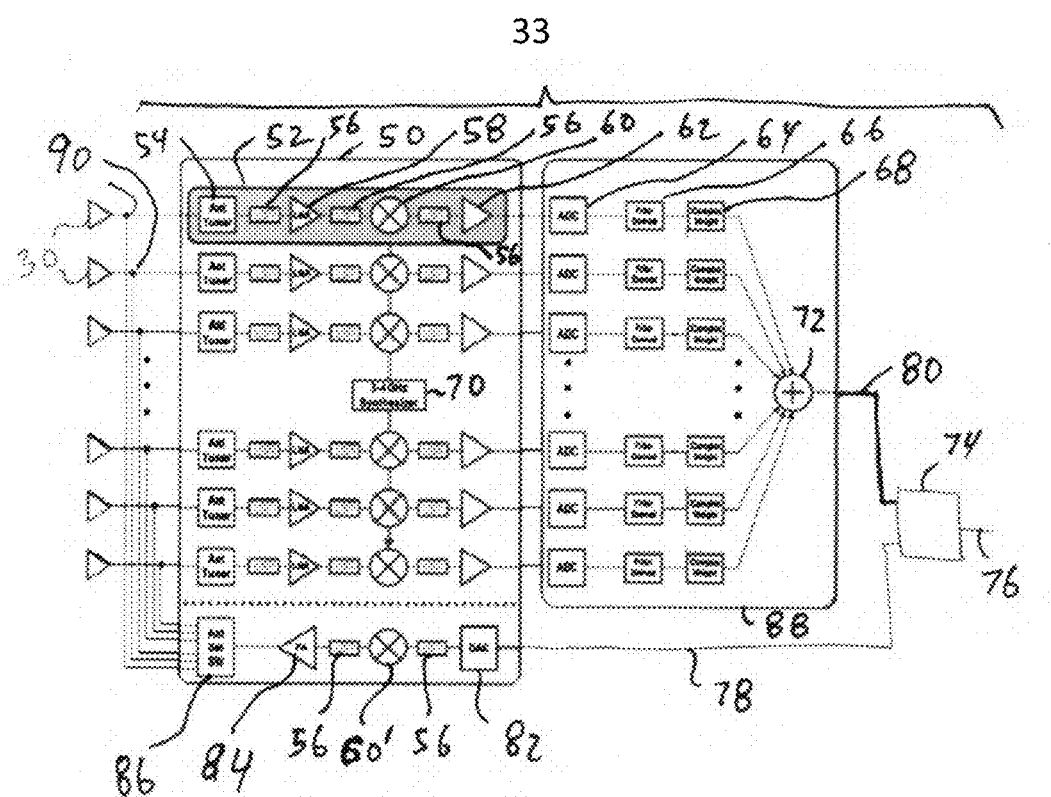
FIG. 3 presents a diagram of illustrative wireless circuitry, in accordance with some embodiments.

FIG. 3 presents illustrative wireless circuitry 33, e.g., that may be used in electronic device 18. As shown in FIG. 3, wireless circuitry 33 may include radio-frequency front-end circuitry 50, array processing circuitry 88 (e.g., space-time adaptive processing circuitry), and baseband circuitry 74 (e.g., modem circuitry, etc.). Front-end circuitry 50, array processing circuitry 88, and baseband circuitry 74 may be implemented using one or more integrated circuits. As an example, front-end circuitry 50 may be implemented using one or more silicon germanium (SiGe) integrated circuits and/or other circuits configured to handle high-speed analog signals. Array processing circuitry 88 and baseband circuitry 74 may be formed from one or more complementary metal-oxide-semiconductor (CMOS) integrated circuits. Path 76 may be used to couple (directly or indirectly) circuitry 74 to control circuitry, e.g., to control circuitry 34 of FIG. 2.

Antennas 30 and wireless circuitry 32 may be used to form a beam steering antenna array (e.g., a phased antenna array), may be used in an antenna diversity scheme (e.g., by selectively activating antenna(s) with satisfactory performance and selectively deactivating antenna(s) with unsatisfactory performance), may be used in implementing a multiple-input-multiple-output antenna arrangement, and/or may be used in implementing other types of wireless circuits for transmitting and receiving satellite signals (and optionally other signals such as cellular telephone signals, wireless local area network signals, personal area network signals, etc.).

Front-end circuitry 50 may include antenna signal receiver circuits, such as antenna receiver circuit 52. Each circuit 52 may be associated with a respective one of antennas 30. As shown in FIG. 3, each circuit 52 may include a respective antenna tuner 54 that receives analog antenna signals from a corresponding one of antennas 30, a low noise amplifier 58 that amplifies signals from tuner 54, a mixer such as mixer such as mixer 60 that receives a local oscillator signal from local oscillator 70 (e.g., a synthesizer that produces an alternating current signal at 3-4 GHz, 3-8 GHz, or other suitable local oscillator frequencies) to down-convert the amplified signals from amplifier 58 into down-converted signals for low-noise amplifier 62. Further, filters 56 may be used to remove noise and/or to block out-of-band signals.

Array processing circuitry 88 may include blocks of circuitry that are each associated with a respective one of circuits 52 and that each convert the analog signals from a respective circuit 52 into digital signals using a respective analog-to-digital converter 64. The output of each analog-to-digital converter 64 is routed to summing circuit 72 via a respective filter and demodulator circuit 66 and complex weighting circuit 68. Summing circuit 72 combines the digital signals from antennas 30 in accordance with the complex weights (phase and magnitude) associated with weighting circuits 68 before these signals are provided to baseband processor 74 via path 80 for demodulation into a data stream, e.g., for control circuitry 34 over path 76.

Transmitted signals from control circuitry 34 and baseband processor 74 may be supplied to digital-to-analog converter circuit 82 in front-end circuitry 50. Digital-to-analog converter circuit 82 may supply output signals that are upconverted using mixer 60'. Upconverted signals (e.g., analog signals at C-band frequencies or other suitable satellite frequencies) may be amplified by power amplifier 84 and may be routed to appropriate antennas 30 using the matrix of coupling circuits 90 (e.g., passive couplers, switches, etc.). Filter circuitry 56 may be used to reduce out-of-band signals. Array processing circuitry 88 may include an adaptive array processor that controls the relative complex weights that are applied to the signals that are summed at summing circuit 72. This allows array processing circuitry 88 to implement beam steering operations and/or other operations that enhance the ability of wireless circuitry 32 to satisfactorily receive incoming signals.

In the example of FIG. 3, transmitted signals from baseband processor 74 are routed to digital-to-analog converter 82 via path 78, are upconverted by upconverter 60', are amplified by power amplifier 84, and are distributed to one or more selected antennas 30 via antenna selection switch 86 and coupling circuits 90. If desired, a separate signal transmitting circuit may be associated with each antenna 30 (e.g., a separate power amplifier and separate phase and magnitude adjustment circuit may be associated with each antenna 30 in the array of antennas to implement beam steering operations for transmitted signals). The configuration of FIG. 3 is merely illustrative of one possible implementation.

If desired, any/all of antenna impedance measurement circuitry, proximity detectors, received signal strength indicator circuitry (e.g., circuitry in baseband processor 74 that monitors incoming signal strength), and/or other circuitry may be used to monitor antenna performance for each of antennas 30, e.g., in real time. If an antenna becomes impaired (e.g., when blocked by a user's hand or other external object such as a table, etc., or when it is experiencing interference) that antenna may be selectively switched out of use and one or more unimpaired antennas (or relatively higher performing) may be switched into use. Antenna diversity schemes such as this may be used to selectively activate the highest (best) performing antenna(s) in an array of antennas 30 during signal transmission and/or during signal reception operations.

Figure 4:
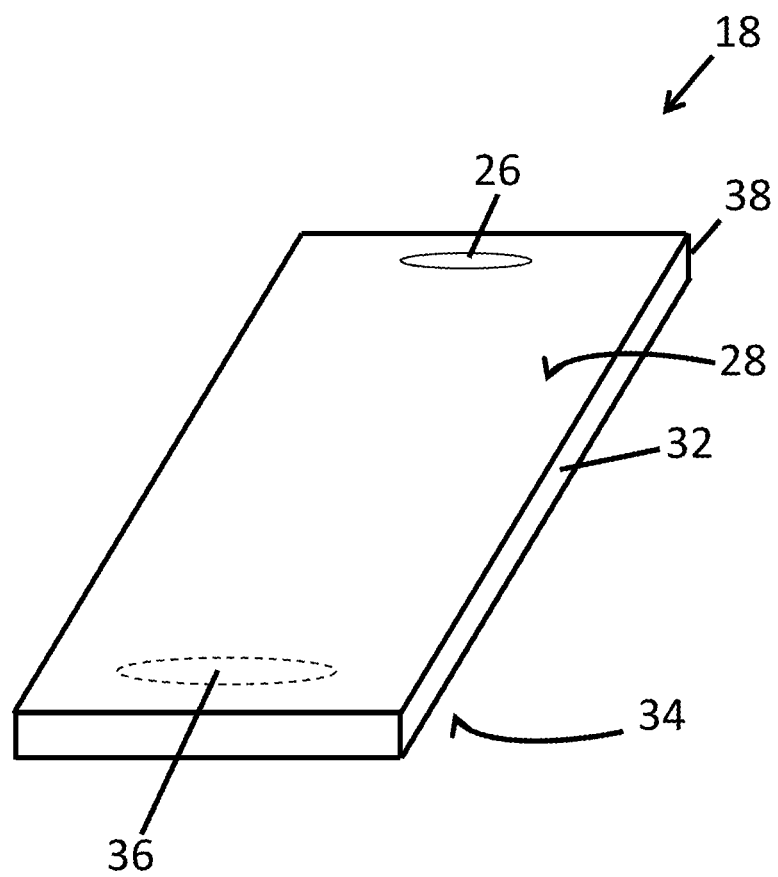
FIG. 4 presents a perspective view of an illustrative handheld device, in accordance with some embodiments.

Electronic device 18 may be a handheld electronic device, portable, electronic device, wearable device, etc. As shown in FIG. 4, electronic device 18 may have a housing such as housing 38, which may be formed from dielectric materials such as glass, plastic, and/or ceramic and/or conductive materials, such as metal (e.g., aluminum, stainless steel, etc.). A display, such as display 28, may be mounted to (or otherwise integrated with) housing 38, e.g., on the front face of electronic device 18. A rear housing wall, such as rear wall 34, may be formed on an opposing rear face of electronic device 18. Sidewalls 32 may have flat or curved cross-sectional shapes and may run around the periphery of electronic device 18, and extend between display 28 on the front face of electronic device 18 and rear wall 34 on the rear face of electronic device 18.

As illustrated by electronic device 18 of FIG. 4, in at least some embodiments, electronic device 18 may have a rectangular footprint (outline when viewed from the front) and sidewalls 32 may run alone each of four peripheral edges of device 18. There may be openings in display 28 such as speaker opening 26. Display 28 may be an organic light-emitting diode display, a liquid crystal display, or other suitable display. Display 28 may be insensitive to touch or may be a touch screen (in at least some areas) display. A touch screen display may be formed from a capacitive touch sensor or other touch sensor that overlaps an array of pixels.

Touch sensitive areas of display 28, such as area 36, may be used to form button regions (e.g., a menu button, etc.) or physical buttons may be formed in area 36. Buttons and other input-output devices may also be formed along the edges of device 18 (e.g., on sidewalls 32).

Figure 5:
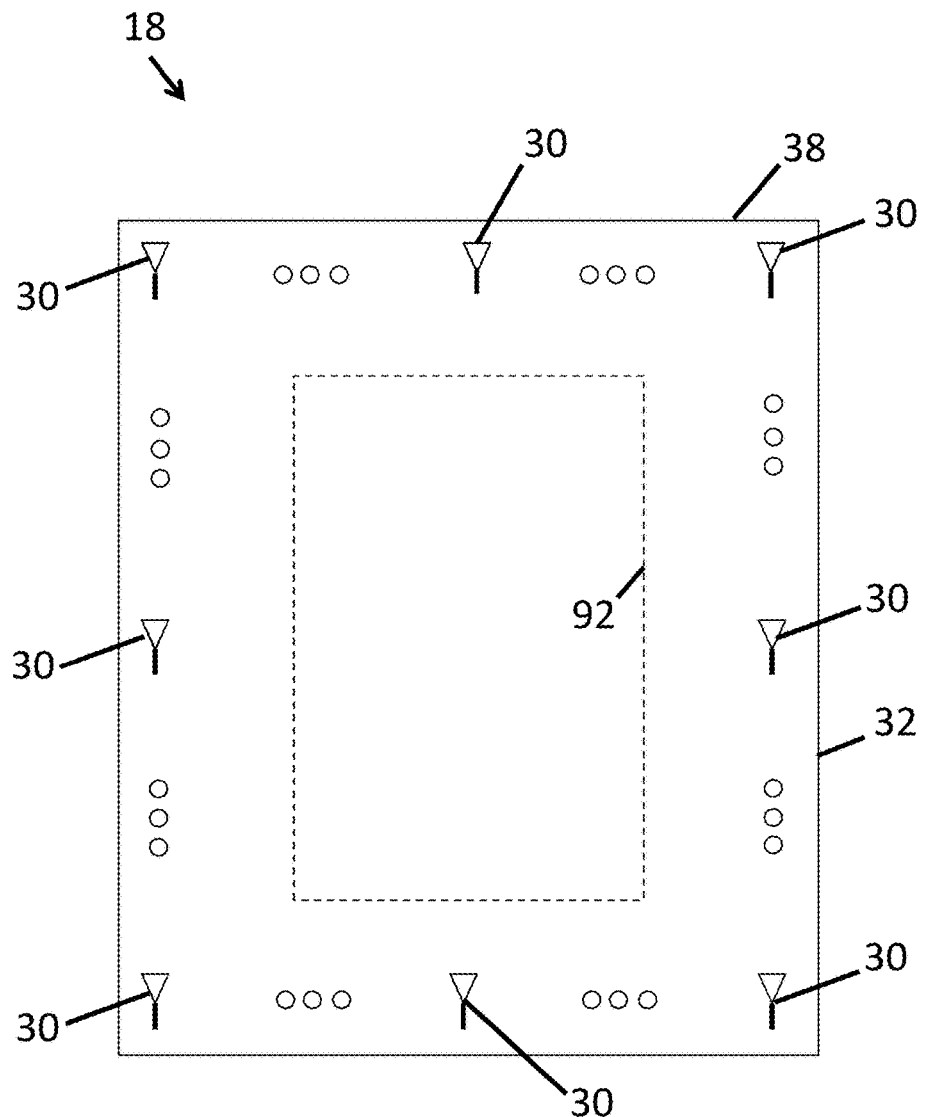
FIG. 5 presents a top view of an illustrative electronic device with an array of antennas, in accordance with some embodiments.

As shown in FIG. 5, the antennas in electronic device 18 may include antennas 30 that are formed along one or more peripheral edges of housing 38. In the example of FIG. 5, housing 38 has opposing left and right edges and opposing upper and lower edges along sidewalls 32. Central region 92 of electronic device 18 may be used for other purposes, such as near-field antennas, batteries, integrated circuits, printed circuit boards, sensors, and/or other components (e.g., input-output devices 36, control circuitry 34, and/or wireless circuitry 32 of FIG. 2). Components such as these may also be formed within other portions of housing 38, such as within the area between region 92 and sidewalls 32.

Antennas 30 that are formed along the periphery of housing 38 (e.g., along the left, right, upper, and lower edges of housing 38 and/or at the corners of housing 38 as shown in FIG. 5) and/or that are formed in other (non-peripheral) locations in housing 38, such as on the front and/or rear faces of housing 38, may include any/all of dipole antennas, patch antennas, and/or other types of antennas. In some implementations, antennas 30 may include one or more, two or more, three or more, or four or more corner dipole antennas formed from outwardly directed dipole antenna elements at the corners of housing 38, one or more edge dipole antennas that are formed from dipole antenna elements running along the edges of housing 38, and/or one or more patch antennas and/or antennas of other types located at the edges, corners, and/or other portions of housing 38. Patch antennas in antennas 30 may have planar patch resonating elements that lie parallel to the planes of the front and rear faces of electronic device 18 and/or that are perpendicular to the planes of the front and rear faces of electronic device 18 (as examples).

Figure 6:
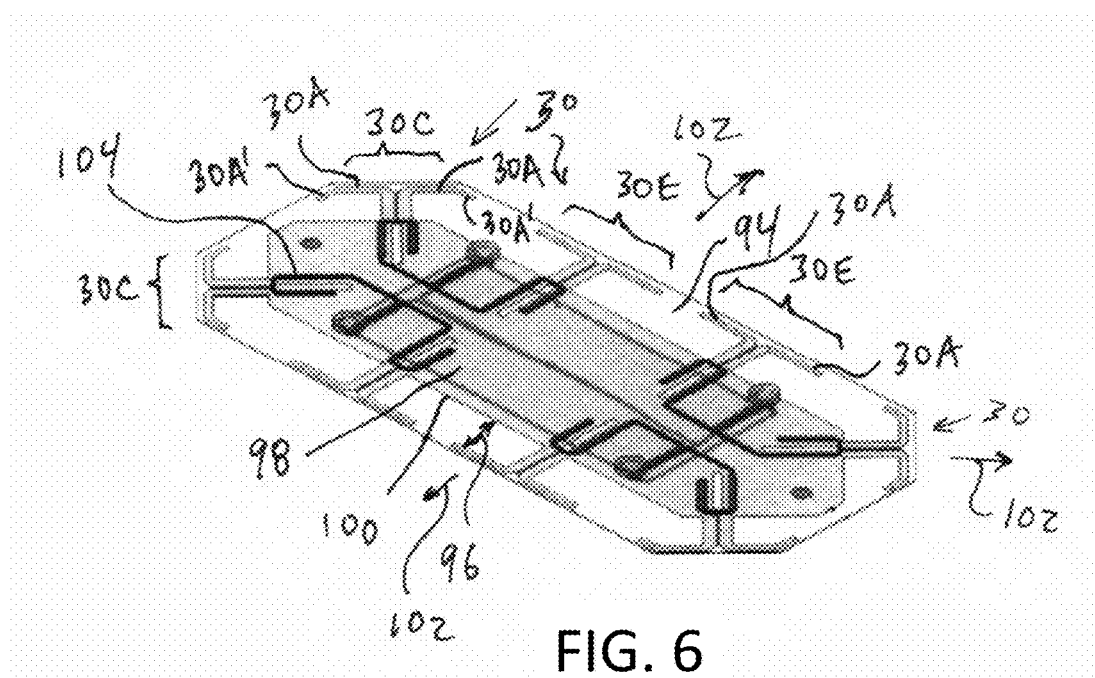
FIG. 6 presents a perspective view of an illustrative array of dipole antennas that run along the periphery of an electronic device housing, in accordance with some embodiments.

FIG. 6 is a perspective view of an illustrative arrangement for forming an array of antennas 30 from dipole antenna elements on a substrate that is mounted within an electronic device housing, e.g., housing 38. Substrate 94 may be, for example, a planar printed circuit that lies within housing 38, between the front and rear faces of the device, e.g., electronic device 18, so that the peripheral edges of the printed circuit run parallel to adjacent peripheral edges of housing 38. In other embodiments, other substrates may be used to support antennas 30 if desired.

As shown in FIG. 6, each dipole antenna 30 may be formed from a pair of dipole antenna arms 30A. Dipole antenna arms 30A may be formed from metal traces on substrate 94. Dipole antenna arms 30A may be separated by a gap 96 from edge 100 of metal ground plane 98. Edge 100 of ground plane 98 may serve as an antenna reflector that helps enhance antenna efficiency in outward directions 102 (e.g., the presence of ground 98 helps provide antennas 30 with an outwardly oriented directionality). Ground plane 98 may be formed, e.g., from metal traces on substrate 94. Antennas 30 may be fed using transmission lines 104. Transmission lines 104 may be formed from metal traces on printed circuit 94 and may be used in coupling (directly or indirectly) antennas 30 to circuitry, e.g., circuitry 50 (FIG. 3).

There may be any suitable number of antennas 30 in electronic device 18. As shown in the example of FIG. 6, there may be at least four corner dipole antennas 30C and four edge dipole antennas 30E in the array of antennas 30 of electronic device 18. Arms 30A of edge antennas 30E may be straight (unbent) arms that run parallel to sidewalls 32 of electronic device 18 (FIG. 5). Arms 30A of corner antennas 30C may have bent tips 30A' and may therefore sometimes be referred to as bent dipoles or bent dipole arms. The use of corner antennas 30 may help ensure adequate antenna coverage for electronic device 18, even when the edges of electronic device 18 are temporarily covered, e.g., by a user's hand or other external object that may reduce antenna efficiency.

In accordance with an embodiment, an electronic device configured to wirelessly communicate with satellites is provided that includes a rectangular housing, a printed circuit board within the housing, an array of dipole antennas on peripheral portions of the printed circuit board and a metal trace in a central portion of the printed circuit board, the metal trace has an edge that serves as a reflector for the dipole antennas.

In accordance with another embodiment, each of the dipole antennas has arms and at least some of arms have bent tips.

In accordance with another embodiment, the rectangular housing has first and second opposing edges and the array of dipole antennas includes at least a first dipole antenna on the first edge and a second dipole antenna on the second edge.

In accordance with another embodiment, the rectangular housing has four edges and four corners, each corner being located between a pair of the four edges and the array of dipole antennas includes at least two edge antennas located on at least two of the four edges and at least two corner antennas located on at least two of the four corners.

In accordance with another embodiment, the each of the edge antennas has straight arms and each of the corner antennas has bent arms.

In accordance with another embodiment, the rectangular housing has four edges and four corners, each corner being located between a pair of the four edges, and the array of dipole antennas includes at least two edge antennas located on at least two of the four edges and at least four corner antennas, each corner antenna being located on a respective one of the four corners and having first and second arms with bent tips.

In accordance with another embodiment, each of the edge antennas has a pair of straight arms without bent tips.

In accordance with another embodiment, the electronic device includes wireless circuitry coupled to the array of antennas that is configured perform beam steering while receiving signals with the array of antennas.

In accordance with another embodiment, the electronic device has opposing front and rear faces and the electronic device includes a display in the housing that covers the front face.

In accordance with another embodiment, the electronic device includes wireless circuitry coupled to the array of antennas, the array of antennas and the wireless circuitry are configured to receive C-band satellite signals.

In accordance with an embodiment, an electronic device that has opposing front and rear faces and that is configured to wirelessly communicate with satellites is provided that includes a rectangular housing having a periphery, a display mounted to the housing on the front face, and an array of antennas extending along the periphery of the rectangular housing, the array of antennas includes at least two edge dipole antennas along two opposing edges of the rectangular housing and at least four corner dipole antennas at four respective corners of the rectangular housing.

In accordance with another embodiment, the electronic device includes wireless circuitry coupled to the array of antennas, the array of antennas and the wireless circuitry are configured to receive satellite signals.

In accordance with another embodiment, the corner dipole antennas each include a pair of arms with bent tips.

In accordance with another embodiment, each of the edge dipole antennas has straight arms.

In accordance with another embodiment, the electronic device includes a ground with an edge that serves as a reflector for each of the corner dipole antennas and each of the edge dipole antennas.

In accordance with another embodiment, the electronic device includes a printed circuit, where the ground includes a metal ground trace on the printed circuit and each of the antennas is formed from metal traces on the printed circuit.

In accordance with another embodiment, the array of antennas and the wireless circuitry are configured to receive C-band satellite signals.

In accordance with another embodiment, the array of antennas includes at least one patch antenna configured to receive the C-band satellite signals.

In accordance with an embodiment, an electronic device having front and rear faces is provided that includes a housing having sidewalls that run along a periphery of the housing and that extend between the front and rear faces, an array of antennas running along the periphery, the array of antennas includes at least two edge antennas on edges of the housing and at least two corner antennas on corners of the housing, and wireless circuitry coupled to the array of antennas, the array of antennas and the wireless circuitry is configured to transmit and receive satellite signals.

In accordance with another embodiment, the two corner antennas comprise dipole antennas with bent arms.

In accordance with another embodiment, the electronic device includes a display that is coupled to the housing and that covers the front face, the edge antennas include dipole antennas and the wireless circuitry is configured to transmit and receive C-band satellite signals and cellular telephone signals.

The foregoing is merely illustrative and various modifications can be made to the described embodiments. The foregoing embodiments may be implemented individually or in any combination.

What is claimed is:

1. An electronic device configured to wirelessly communicate with one or more satellites, comprising:
   a rectangular housing;
   a printed circuit board within the rectangular housing;
   an array of dipole antennas on peripheral portions of the printed circuit board;
   a metal trace in a central portion of the printed circuit board, wherein the metal trace has an edge that serves as a reflector for the array of dipole antennas; and
   wireless circuitry coupled to the array of dipole antennas, wherein:
   the array of dipole antennas and the wireless circuitry are configured to receive C-band satellite signals,
   the rectangular housing has four edges and four corners, each of the four corners being located between a respective pair of the four edges,
   the array of dipole antennas includes at least two edge antennas located on at least two of the four edges and at least two corner antennas located on at least two of the four corners,
   the at least two edge antennas have straight arms, and
   the at least two corner antennas have bent arms.

2. The electronic device defined in claim 1 further comprising wireless circuitry coupled to the array of dipole antennas that is configured perform beam steering while receiving signals with the array of dipole antennas.

3. The electronic device defined in claim 1 wherein the electronic device has opposing front and rear faces and wherein the electronic device further comprises a display in the rectangular housing that covers the front face.

4. An electronic device configured to wirelessly communicate with one or more satellites, comprising:
   a rectangular housing;
   a printed circuit board within the rectangular housing;
   an array of dipole antennas on peripheral portions of the printed circuit board;
   a metal trace in a central portion of the printed circuit board, wherein the metal trace has an edge that serves as a reflector for the array of dipole antennas; and
   wireless circuitry coupled to the array of dipole antennas, wherein:
   the array of dipole antennas and the wireless circuitry are configured to receive satellite signals,
   the rectangular housing has four edges and four corners, each of the four corners being located between a respective pair of the four edges, and
   the array of dipole antennas includes at least two edge antennas located on at least two of the four edges and at least two corner antennas, each of the at least two corner antennas being located on a respective one of the four corners and having first and second arms with bent tips.

5. The electronic device defined in claim 4 wherein one of the at least two edge antennas has a pair of straight arms without bent tips.

6. The electronic device defined in claim 4, wherein the satellite signals comprise C-band satellite signals.

7. The electronic device defined in claim 4, wherein the satellite signals comprise V-band satellite signals.

8. The electronic device defined in claim 4, wherein the wireless circuitry is configured to transmit and receive cellular telephone signals.

9. The electronic device defined in claim 4, wherein the printed circuit board has at least eight edges.

10. The electronic device defined in claim 4, further comprising transmission lines for the array of dipole antennas, wherein the transmission lines comprise an additional metal trace on the printed circuit board.

11. An electronic device that has opposing front and rear faces and that is configured to wirelessly communicate with one or more satellites, comprising:
a rectangular housing having a periphery;
a display mounted to the rectangular housing on the front face;
an array of antennas extending along the periphery of the rectangular housing, wherein the array of antennas includes at least two edge dipole antennas along two respective opposing edges of the rectangular housing and at least four corner dipole antennas at four respective corners of the rectangular housing; and
wireless circuitry coupled to the array of antennas, wherein the array of antennas and the wireless circuitry are configured to receive C-band satellite signals and wherein one or more of the at least four corner dipole antennas includes a pair of arms with bent tips.

12. The electronic device defined in claim 11 wherein the electronic device further comprises a display in the rectangular housing that covers the front face.

13. The electronic device defined in claim 11 wherein one of the at least two edge dipole antennas has straight arms.

14. The electronic device defined in claim 11 further comprising a ground with an edge that serves as a reflector for the at least four corner dipole antennas and the at least two edge dipole antennas.

15. The electronic device defined in claim 14 further comprising a printed circuit, wherein the ground includes a metal ground trace on the printed circuit and wherein the array of antennas is formed from metal traces on the printed circuit.

16. The electronic device defined in claim 14 wherein the electronic device further comprises a display in the rectangular housing that covers the front face.

17. The electronic device defined in claim 11 wherein the array of antennas includes at least one patch antenna configured to receive the C-band satellite signals.

18. An electronic device having front and rear faces, comprising:
a housing having sidewalls that run along a periphery of the housing and that extend between the front and rear faces;
an array of antennas running along the periphery, wherein the array of antennas includes at least four edge antennas on edges of the housing and at least four corner antennas on corners of the housing; and
wireless circuitry coupled to the array of antennas, wherein the array of antennas and the wireless circuitry are configured to transmit and receive C-band satellite signals, and wherein the corner antennas comprise dipole antennas with bent arms.

19. The electronic device defined in claim 18 further comprising a display that is coupled to the housing and that covers the front face, wherein the edge antennas include dipole antennas and wherein the wireless circuitry is configured to transmit and receive cellular telephone signals.

20. The electronic device defined in claim 18 further comprising a printed circuit, wherein the at least four edge antennas and the at least four corner antennas are formed from conductive traces on the printed circuit.

21. The electronic device defined in claim 20 further comprising a ground plane formed from additional conductive traces on the printed circuit, wherein the at least four edge antennas and the at least four corner antennas surround the ground plane on the printed circuit.

* * * * *